(12) United States Patent
Yakhnich et al.

(10) Patent No.: US 6,944,242 B2
(45) Date of Patent: Sep. 13, 2005

(54) APPARATUS FOR AND METHOD OF CONVERTING SOFT SYMBOL INFORMATION TO SOFT BIT INFORMATION

(75) Inventors: Evgeny Yakhnich, Hadera (IL); Ehud Reshef, Qiryal Tivon (IL)

(73) Assignee: Comsys Communication & Signal Processing Ltd., Herzelsa (IL)

(*) Notice: Subject to any disclaimer, the term of this patent is extended or adjusted under 35 U.S.C. 154(b) by 832 days.

(21) Appl. No.: 09/754,570

(22) Filed: Jan. 4, 2001

(65) Prior Publication Data

US 2002/0122510 A1 Sep. 5, 2002

(51) Int. Cl.[7] ............................................. F03D 9/06
(52) U.S. Cl. ...................................... 375/341; 375/324
(58) Field of Search ................................. 714/755, 792, 714/752, 780; 375/324, 232, 233, 262, 296, 341, 342

(56) References Cited

U.S. PATENT DOCUMENTS

| | | | | | |
|---|---|---|---|---|---|
| 5,446,763 | A | * | 8/1995 | Baum et al. | 375/340 |
| 5,457,704 | A | | 10/1995 | Hoeher et al. | 371/43 |
| 6,023,783 | A | * | 2/2000 | Divsalar et al. | 714/792 |
| 6,499,128 | B1 | * | 12/2002 | Gerlach et al. | 714/755 |
| 6,625,236 | B1 | * | 9/2003 | Dent et al. | 375/341 |
| 2002/0067777 | A1 | * | 6/2002 | Jeong | 375/324 |

OTHER PUBLICATIONS

Khayrallah, A.S., et al., "Improved Channel Estimation With Side Information", IEEE, pp. 1049–1051, 1997.

Boss, Dieter, et al., "Impact of Blind Versus Non-Blind Channel Estimation on the BER Performance of GSM Receivers", IEEE Signal Processing Workshop on Higher-Order Statistics, pp. 62–66, Jul. 21–23, 1997.

Mehrotra, Asha, GSM System Engineering, Artech House Inc., 1997, pp. 169–245.

Haykin, Simon, Adaptive Filter Theory, Prentice Hall, 1996, pp. 483–535.

Gerstacker, Wolfgang H. et al., "Iterative Equalization With Adaptive Soft Feedback", IEEE, not dated.

Gerstacker, Wolfgang H. et al., "Improved Equalization for GSM Mobile Communications", IEEE, not dated.

Hafeez, Abdulrauf, et al., "Decision Feedback Sequence Estimation for Unwhitned ISI Channels With Applications to Multiuser Detection" m IEEE Journal on Selected Areas in Communication, vol. 16, No. 9, pp. 1785–1795, Dec. 1998.

Forney Jr., G. David, "The Viterbi Algorithm", pp. 268–178, Nov. 27, 1972.

Berrou, Claude, et al., "A Low Complexity Soft Output Viterbi Decoder Architecture", IEEE, pp. 737–740, Dec. 1993.

(Continued)

Primary Examiner—Stephen Chin
Assistant Examiner—Curtis Odom
(74) Attorney, Agent, or Firm—Zaretsky & Associates PC; Howard Zaretsky

(57) ABSTRACT

An apparatus for and method of converting soft symbol decision information into soft bit decision information that overcomes the disadvantages of the prior art. The invention is adapted to receive M soft symbol values where each symbol represents m bits ($M=2^m$). The output for each symbol comprises m soft values of bits representing the symbol. The invention is operative to convert the soft symbol values to soft bit values using the log likelihood ratios (LLRs) of a bit and a symbol expressed as conditional probabilities. The method of the invention is presented which can be performed in either hardware or software. A computer comprising a processor, memory, etc. is operative to execute software adapted to perform the soft symbol to bit conversion method of the present invention.

73 Claims, 10 Drawing Sheets

OTHER PUBLICATIONS

Thielecke, John A. "A Soft–Decision State–Space Equalizer for FIR Channels", IEEE Transactions on Communications, vol. 45, No. 10, pp. 1208–1217. Oct. 10, 1997.

Hansson, Ulf et al., "Soft Information Transfer for Sequence Detection With Concatenated Receivers", IEEE Transactions on Communications, vol. 44, No. 9, pp. 1086–1095, Sep. 1996.

Seshadri, N. et al., "On Post–Decision Symbol–Reliability Generation", IEEE, pp. 741–745, Feb. 1993.

Nagayasu, Takayuki, et al., "A Soft–Output Viterbi Equalizer Employing Expanded Memory Length in a Trellis", IEICE Trans. Commun. vol. E80–B, No. 2, pp. 381–385, Feb. 1997.

Park, Jong II, et al., "Trellis–Based Soft–Output Adaptive Equalization Techniques for TDMA Cellular Systems", IEEE Transactions on Vehicular Technology, vol. 49, No. 1, pp. 83–94, Jan. 2000.

Fossorier, Marc P.C., et al., "On The Equivalence Between SOVA and Max–Log–MAP Decodings", IEEE Communications Letters, vol. 2, No. 5, pp. 137–139, May 1998.

Cong, Ling, et al., "On SOVA for Nonbinary Codes", IEEE Communications Letters, vol. 3, No. 12, pp. 335–337, Dec. 1999.

Hagenauer, Joachim, et al., "A Viterbi Algorithm with Soft–Decision Outputs and its Applications", IEEE, pp. 1680–1686. 1989.

Li, Yunixin, et al., "Optimum Soft–Output Detection for Channels with Intersymbol Interference", IEEE Transactions on Information Theory, vol. 14, No. 3, pp. 704–713, May 1995.

Proakis, John G. Digital Communications, McGraw–Hill, 1989, pp. 602–643.

Han, Youngyearl, "On The Minimization of Overhead in Channel Impulse Response Measurement", IEEE Transactions on Vehicular Technology, vol. 47, No. 2, pp. 631–636, May 1998.

* cited by examiner

APPARATUS FOR AND METHOD OF CONVERTING SOFT SYMBOL INFORMATION TO SOFT BIT INFORMATION

REFERENCE TO RELATED APPLICATION

The subject matter of the present application is related to and may be advantageously combined with the subject matter of copending and commonly owned application U.S. application Ser. No. 09/616,161, to Yakhnich et al, filed Jul. 14, 2000, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of converting soft decision symbol information into soft decision bit information.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

In connection with cellular services, the majority of users currently subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, TDMA (IS-136) or CDMA (IS-95), for example.

A diagram illustrating an example prior art communication system employing an inner and outer encoder in the transmitter, inner and outer decoding stages in the receiver and a noise source after the channel is shown in FIG. 1. The communication system, generally referenced 10, represents the typical scheme that may be used in many of the communication services described above. In such as system, the transmitter 11 comprises an encoder 14, interleaver 15, symbol generator 16 and modulator 18. Input data bits 12 to be transmitted are input to the encoder 14 which may comprise an error correction encoder such as Reed Solomon, convolutional encoder, parity bit generator, etc. The encoder functions to add redundancy bits to enable errors in transmission to be located and fixed.

It is noted that both the inner and outer decoders in the receiver have complimentary encoders in the transmitter. The outer encoder in the transmitter comprises the encoder 14, e.g., Reed Solomon, etc. The inner encoder comprises the channel 20 which often times can be modeled as an L-symbol long FIR-type channel.

The bits output of the encoder are then interleaved wherein the order of the bits are changed so as to more efficiently combat error bursts. The rearrangement of the bits caused by interleaving improves the resistance to error bursts but add latency and delay to the transmission.

The bits output of the interleaver are then mapped to symbols by the symbol generator 16. The symbol generator functions to transform the bits to modulator symbols. For example, an 8-PSK modulator converts input bits into one of eight symbols. Thus, the symbol generator generates a symbol for every three input bits.

The output from the mapper is input to the modulator which receives symbols in the M-ary alphabet and generates the analog signal that is subsequently transmitted over the channel 20. The channel may comprise a mobile wireless channel, e.g., cellular, cordless, a fixed wireless channel, e.g., satellite, or may comprise a wired channel, e.g., xDSL, ISDN, Ethernet, etc. The processing performed in the transmitter is intended to generate a signal that can be transmitted over the channel so as to provide robust, error free detection by the receiver.

At the receiver 13, the analog signal from the channel is input to front end circuitry 22 which demodulates and samples the received signal to generate received samples y(k) 21. The samples are first input to an inner decoder 24. An example of an inner decoder is an equalizer which compensates for the ISI caused by the delay and time spreading of the channel in attempting to detect the symbols that were originally transmitted by the modulator.

Equalizers can be adapted to output hard symbol decisions or soft symbol decisions. Examples of commonly used types of hard decision equalizers include the maximum likelihood sequence estimation (MLSE) equalizer that utilize the well known Viterbi Algorithm (VA), linear equalizer and decision feedback equalizer (DFE). Examples of soft output type equalizers include Soft Output Viterbi Algorithm (SOVA) type equalizers and equalizers based on the Maximum A Posteriori (MAP) algorithm.

In the case of a hard output equalizer, the output of the inner decoder comprises symbols s(k) 23 which represent hard decisions. If a soft output decoder is used, the symbols s(k) output of the inner decoder comprise soft symbol decisions. The output of the inner decoder is then input to a symbol to bit de-mapper 25 which is adapted to map the received symbols to bits. In the case of 8-PSK, for example, each symbol is mapped to three bits.

The output of the symbol to bit mapper is then input to a bit de-interleaver 26 which functions to restore the original order of the bits. The bits are then input to an outer decoder 29 which functions to locate and fix errors using the redundancy inserted by the encoder. The outer decoder generates the binary receive data $a_k$ 28.

Examples of the outer decoder include turbo decoders and convolutional decoders that utilize the Viterbi Algorithm. This class of decoders provides better performance by taking into account soft information about the reliability of the received symbol. The improved performance of the decoder cannot be realized, however, when soft information about the received symbols is not available. Note that the Viterbi algorithm is widely used in communication systems and has been adapted to perform functions including demodulation, decoding, equalization, etc. Many systems utilize the Viterbi Algorithm in both the inner and outer decoding stages.

As described above, the outer decoder, in some systems, is adapted to utilize the symbol decisions output from the inner decoder, e.g., the equalizer. Optimal decoders, however, require soft decisions rather than hard decisions. For example, an outer decoder that utilizes the Viterbi Algorithm to perform convolutional forward error correction decoding, requires soft decisions as input. The advantage of a Viterbi decoder is that it can efficiently process soft decision information. In order to provide soft symbol decisions, the inner decoder typically comprises a soft output equalizer such as a SOVA or MAP based equalizer.

In some cases, such as with a system using a punctured code or bit wise rather then symbol wise interleaving, soft symbol decisions cannot be used. In such cases, optimal decoders require soft bit inputs rather than soft symbol inputs. Soft bit decisions may comprise a bit value and the reliability of the decision. Alternatively, a soft bit decision may comprise only the reliability value for a '1' (or alternately '0') decision.

Although the de-mapper maps the symbols into bits, there is no mechanism to convert the soft symbol decision information into soft bit decision information, which is needed by the soft outer decoder.

The problem is illustrated when considering a receiver adapted to handle a GSM Enhanced General Packet Radio System (EGPRS) signal. Such a system utilizes a bit wise interleaver and punctured convolutional coding for performing Forward Error Correction (FEC) over channels that require equalization. Assume that the equalizer employs a Soft Output Viterbi Algorithm in its operation and that the outer FEC decoder employs the Viterbi Algorithm. After de-interleaving, the soft symbol decision information output of the equalizer is no longer related to the bits output of the de-interleaver.

A prior art technique for generating soft bit decisions is described in "A Soft-Decision State-Space Equalizer for FIR Channels," J. Thielecke, IEEE Transactions on Communications, Vol. 45, No. 10, October 1997. A nonlinear equalizer is described that is intended for FIR channels which is based on a state-space description of the channel. The algorithm utilizes equations that resemble a Kalman hard decision feedback equalizer whereby the probability estimates of the received bits are incorporated.

A disadvantage of this prior art technique is that the level of computational complexity is relatively high making implementation difficult in communication systems. In addition, the technique is restricted to a particular type of channel and a particular way of describing the channel.

SUMMARY OF THE INVENTION

Accordingly, the present invention provides a novel and useful apparatus for and method of converting soft symbol decision information into soft bit decision information that overcomes the disadvantages of the prior art. The present invention is suitable for use with a wide range of communication systems and is particularly useful in receivers that comprise concatenated coding schemes whereby the output of an inner decoder is subsequently processed by an outer decoder wherein the outer decoder is a soft decision decoder whose performance is optimized when soft decision values are available.

The invention is adapted to receive M soft symbol values where each symbol represents m bits ($M=2_m$). Alternatively, M−1 soft symbols are input wherein the $M^{th}$ symbol is a reference symbol that is implied. A sub-optimal implementation of the invention is adapted to receive fewer than M soft symbol decisions. The output for each symbol comprises m soft values of bits representing the symbol. The invention is operative to convert the soft symbol values to soft bit values using the log likelihood ratios (LLRs) of a bit and a symbol expressed as conditional probabilities. As shown by simulations, the method of the invention provides for improved performance of several dBs.

A key feature of the invention is that it is operative to convert soft symbol values to soft bit values which can subsequently be used by a soft input outer decoder thus realizing maximum performance therefrom. It is noted that the invention achieves this using a relatively low complexity technique described infra.

The method of the invention is presented which can be performed in either hardware or software. A computer comprising a processor, memory, etc. is operative, to execute software adapted to perform the soft symbol to soft bit conversion method of the present invention.

The present invention enables the use of soft decoding in systems that incorporate a bit-wise rather than a symbol-wise interleaver. An example of such a system is the GSM Enhanced General Packet Radio System (EGPRS). The present invention is also applicable in systems wherein the encoder uses a different size alphabet than the modulator. A system may have, for example, a ½ rate code encoder concatenated with an 8-PSK modulator. In such a system, the soft symbol decision information output of the equalizer in the receiver does not match the type of soft decision information required by the decoder.

The invention provides the following advantages and benefits. The conversion of soft symbols to soft bits effectively decouples the modulator and encoder that utilize different size alphabets. It also makes the outer decoder independent of the type of equalizer used in the receiver so long as it can provide soft symbol decisions. In addition, the invention enables the use of either bit-wise interleaving or symbol-wise interleaving. In either case, the soft outer decoder is provided the necessary soft bit information. The soft bit output conversion method is computationally efficient in that a minimum of arithmetic operations are required for its implementation.

A key benefit of the present invention is that the performance of any communication system embodying the present invention is enhanced by enabling the soft decoding of FEC codes, e.g., soft decoding of convolutional codes or the soft decoding of block codes, turbo codes, etc.

There is thus provided in accordance with the present invention a method of generating soft bit outputs from soft symbol decisions for an M-ary symbol alphabet in a communication receiver coupled to a channel wherein the communication receiver includes a first decoder adapted to generate the soft symbol decisions from a received signal, the method comprising the steps of receiving M soft symbol decisions for each symbol, wherein each symbol is represented by m bits, partitioning the soft symbol decisions into m bit groups, each the bit group comprising a zero-bit portion and a one-bit portion, summing all soft symbol values in the zero-bit portion of a particular bit group of interest, so as to generate a first sum, summing all soft symbol values in the one-bit portion of a particular bit group of interest, so as to generate a second sum, computing a soft bit value for the particular bit of interest as a function of the first sum and the second sum and wherein m and M are positive integers.

There is also provided in accordance with the present invention a method of generating soft bit outputs from soft symbol decisions for an M-ary symbol alphabet, the method comprising the steps of receiving m+1 soft symbol values for each symbol wherein each symbol is represented by m bits, and wherein the m+1 soft symbol values comprise a first soft symbol value corresponding to a most likely symbol and m second soft symbol values, wherein each the second soft symbol value corresponds to a symbol closest in Euclidean distance to the most likely symbol whose bit in the position of interest is opposite that of the analogous bit in the most likely symbol, computing a soft bit value for each bit of interest as a function of the first soft symbol value and the plurality of second soft symbol values and wherein m and M are positive integers.

There is further provided in accordance with the present invention a method of generating soft bit outputs from soft symbol decisions for an M-ary symbol, the method comprising the steps of receiving M soft symbol decisions for each symbol, wherein each symbol is represented by m bits, partitioning the soft symbol decisions into m bit groups, each the bit group comprising a zero-bit portion and a one-bit portion, selecting, for each bit group of interest, a first maximum soft symbol value from among the soft symbol values in the zero-bit portion, selecting, for each bit group of interest, a second maximum soft symbol value from among the soft symbol values in the one-bit portion, computing a soft bit value for each bit of interest as a function of the first maximum soft symbol value and the second maximum soft symbol value and wherein m and M are positive integers.

There is also provided in accordance with the present invention a method of generating soft bit outputs from soft symbol decisions, the method comprising the steps of receiving a plurality of soft symbol values for each symbol, determining, for each bit in the symbol, a first likelihood representing the probability that the bit is a one, determining, for each bit in the symbol, a second likelihood representing the probability that the bit is a zero and computing a soft bit value for the bit as a function of the first likelihood and the second likelihood.

There is still further provided in accordance with the present invention a communications receiver for receiving and decoding an M-ary transmitted signal comprising a radio frequency (RF) front end circuit for receiving and converting the M-ary transmitted signal to a baseband signal, a demodulator adapted to receive the baseband signal and to generate a received signal therefrom in accordance with the M-ary modulation scheme used to generate the transmitted signal, a first decoder operative to receive the received signal and to generate a sequence of soft symbol decisions therefrom, a soft symbol decision to soft bit output converter comprising processing means programmed to receive a plurality of soft symbol values for each symbol, determine, for each bit in the symbol, a first likelihood representing the probability that the bit is a one, determine, for each bit in the symbol, a second likelihood representing the probability that the bit is a zero and compute a soft bit value for the bit as a function of the first likelihood and the second likelihood and a second decoder adapted to receive the soft bit values and to generate binary received data therefrom.

There is also provided in accordance with the present invention a computer readable storage medium having a computer program embodied thereon for causing a suitably programmed system to generate soft output values by performing the following steps when such program is executed on the system: receiving a plurality of soft symbol values for each symbol, determining, for each bit in the symbol, a first likelihood representing the probability that the bit is a one, determining, for each bit in the symbol, a second likelihood representing the probability that the bit is a zero and computing a soft bit value for the bit as a function of the first likelihood and the second likelihood.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
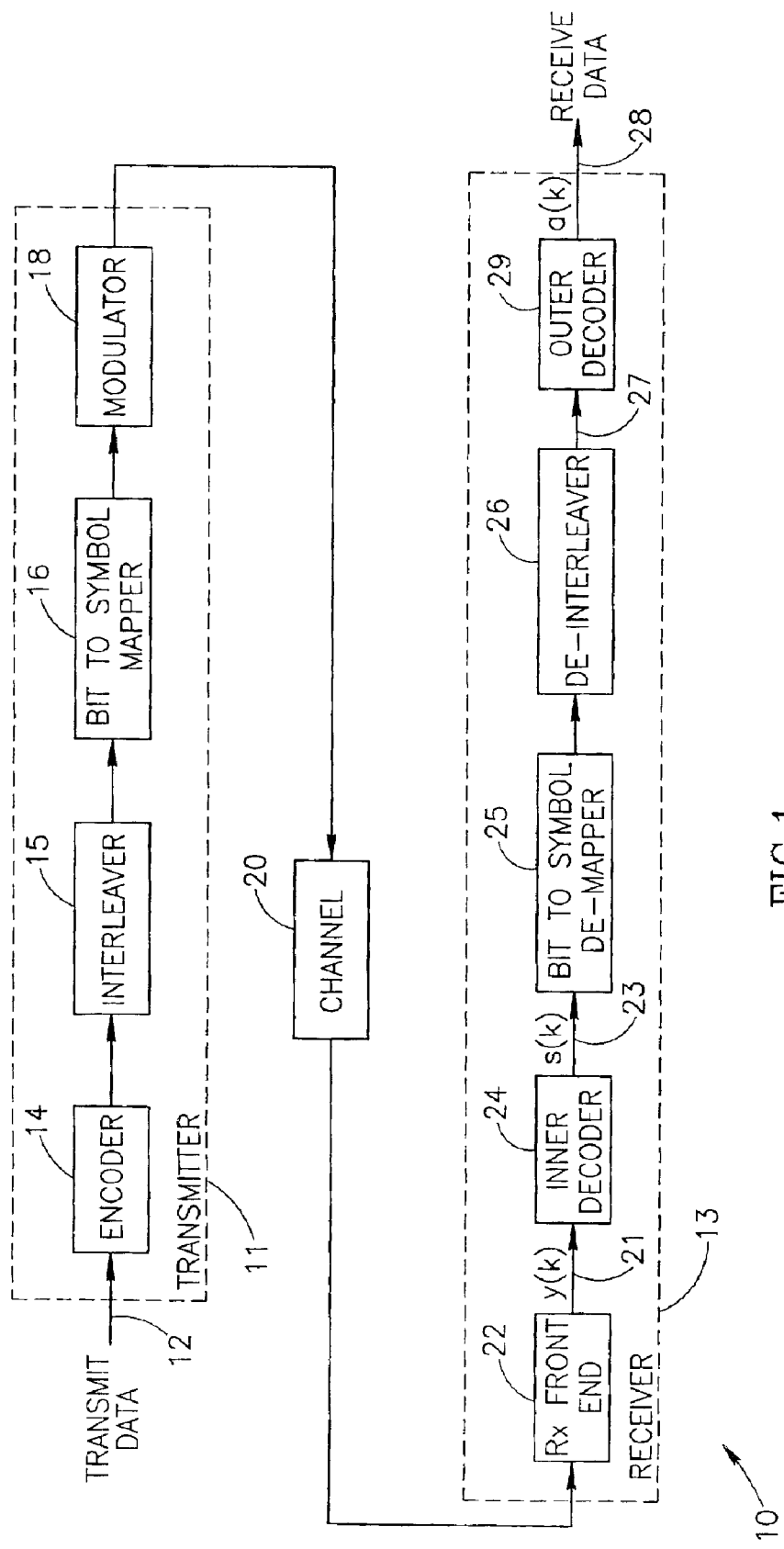
FIG. 1 is a diagram illustrating an example prior art communication system employing an inner and outer encoder in the transmitter, inner and outer decoding stages in the receiver and a noise source added to the channel.

The following notation is used throughout this document.

| Term | Definition |
|---|---|
| AMPS | Advanced Mobile Telephone System |
| ASIC | Application Specific Integrated Circuit |
| AWGN | Additive White Gaussian Noise |
| BER | Bit Error Rate |
| CDMA | Code Division Multiple Access |
| CPU | Central Processing Unit |

-continued

| Term | Definition |
| --- | --- |
| DFE | Decision Feedback Equalizer |
| DSL | Digital Subscriber Line |
| DSP | Digital Signal Processor |
| EDGE | Enhanced Data rates for GSM and TDMA/136 Evolution |
| EEPROM | Electrically Erasable Programmable Read Only Memory |
| EGPRS | Enhanced General Packet Radio System |
| FEC | Forward Error Correction |
| FIR | Finite Impulse Response |
| FPGA | Field Programmable Gate Array |
| GERAN | GSM EDGE Radio Access Network |
| GMSK | Gaussian Minimum Shift Keying |
| GSM | Global System for Mobile Communication |
| IIR | Infinite Impulse Response |
| ISDN | Integrated Services Digital Network |
| ISI | Intersymbol Interference |
| LLR | Log Likelihood Ratio |
| MAP | Maximum A Posteriori |
| MCS | Modulation Coding Scheme |
| MLSD | Maximum Likelihood Sequence Detection |
| MLSE | Maximum Likelihood Sequence Estimation |
| PSK | Phase Shift Keying |
| RAM | Random Access Memory |
| ROM | Read Only Memory |
| SER | Symbol Error Rate |
| SNR | Signal to Noise Ratio |
| SO | Soft Output |
| SOVA | Soft Output Viterbi Algorithm |
| SSA | Suboptimum Soft-output Algorithm |
| SSB | Second Significant Bit |
| TACS | Total Access Communications Systems |
| TDMA | Time Division Multiple Access |
| VA | Viterbi Algorithm |
| WLAN | Wireless Local Area Network |
| WLL | Wireless Local Loop |

DETAILED DESCRIPTION OF THE INVENTION

The present invention is an apparatus for and method of converting soft symbol decision information into soft bit decision information that overcomes the disadvantages of the prior art. The present invention is suitable for use with a wide range of communication systems and is particularly useful in receivers that comprise concatenated coding schemes whereby the output of an inner decoder is subsequently processed by an outer decoder wherein the outer decoder is a soft decision decoder whose performance is optimized when soft decision values are available.

The invention is adapted to receive M soft symbol values where each symbol represents m bits ($M=2^m$). Alternatively, M−1 soft symbols are input wherein the $M^{th}$ symbol is a reference symbol that is implied. The output for each symbol comprises m soft values of bits representing the symbol. The invention is operative to convert the soft symbol values to soft bit values using the log likelihood ratios (LLRs) of a bit and a symbol expressed as conditional probabilities. Simulations are presented below that show the method of the invention provides a performance improvement of several dBs.

A sub-optimal implementation is also described wherein a reduced set of soft symbols (m or m+1) are generated rather than the complete information packet.

Figure 2:
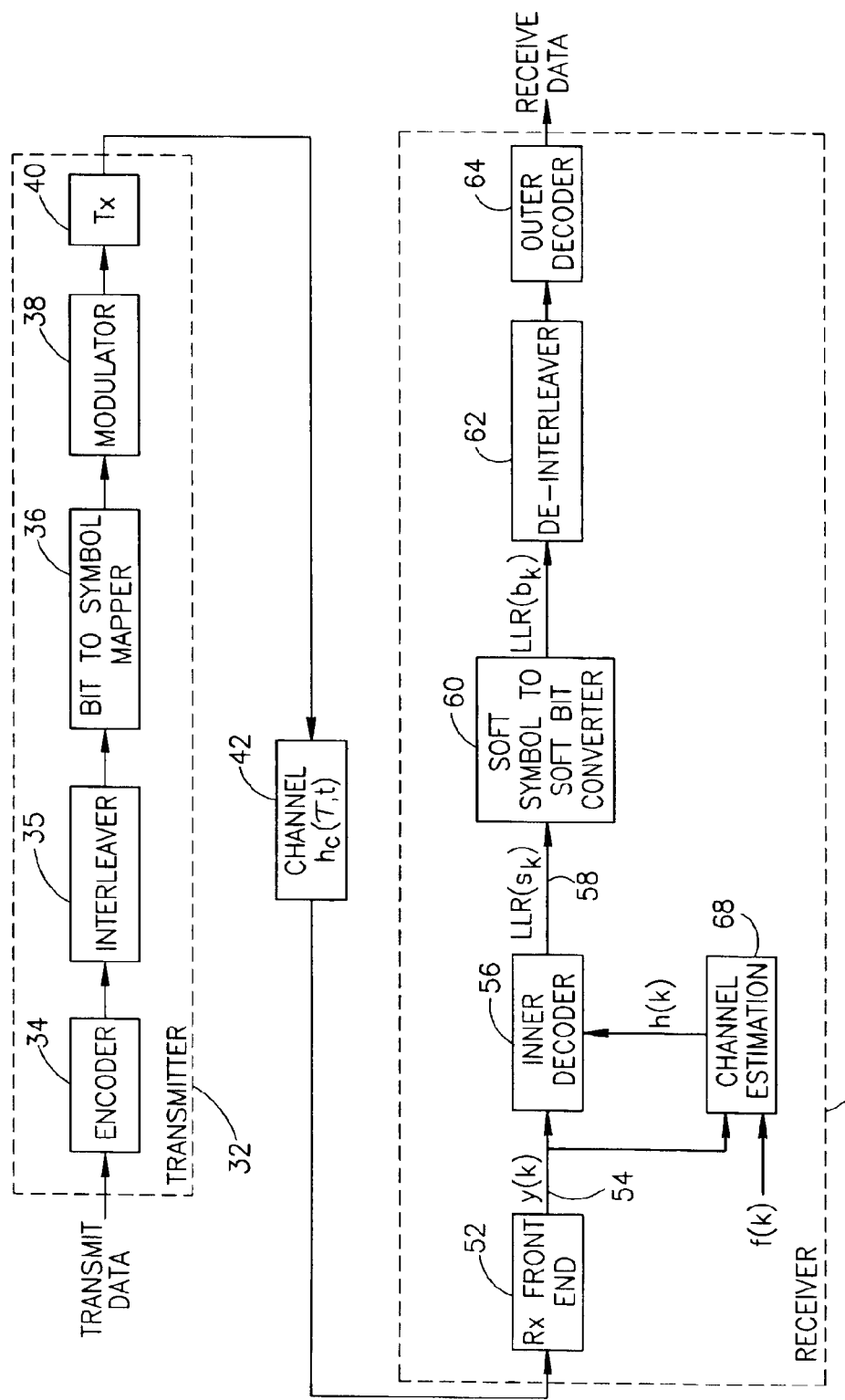
FIG. 2 is a block diagram illustrating a concatenated receiver incorporating a soft decision symbol to bit converter constructed in accordance with the present invention.

A block diagram illustrating a concatenated receiver incorporating a soft decision symbol to bit converter constructed in accordance with the present invention is shown in FIG. 2. The communication system, generally referenced 30, comprises a concatenated encoder transmitter 32 coupled to a channel 42, and a concatenated decoder receiver 50 also coupled to the channel. The transmitter 32 comprises an encoder 34, bit to symbol mapper 36 and modulator 38. Input data bits to be transmitted are input to the encoder 34 which may comprise an error correction encoder such as Reed Solomon, convolutional encoder, parity bit generator, etc. The encoder functions to add redundancy bits to enable errors in transmission to be located and fixed.

The bits output of the encoder 34 are then input to an interleaver 35 which functions to rearrange the order of the bits in order to more effectively combat error bursts in the channel. The bits output of the interleaver are then mapped to symbols by the symbol mapper 36. The bit to symbol mapper functions to transform bits to modulator symbols from an M-ary alphabet. For example, an 8-PSK modulator converts input bits into one of eight symbols. Thus, the mapper in this case generates a symbol for every three input bits.

The symbols output from the mapper are input to the modulator 38 which functions to receive symbols in the M-ary alphabet and to generate the analog signal therefrom that is subsequently transmitted over the channel 42. The channel may comprise a mobile wireless channel, e.g., cellular, cordless, fixed wireless channel, e.g., satellite, or may comprise a wired channel, e.g., xDSL, ISDN, Ethernet, etc. It is assumed that noise is present and gets added to the signal in the channel. The transmitter is adapted to generate a signal that can be transmitted over the channel so as to provide robust, error free detection by the receiver.

It is noted that both the inner and outer decoders in the receiver have complimentary encoders in the transmitter. The outer encoder in the transmitter comprises the encoder 34, e.g., convolutional, etc. The inner encoder comprises the channel 42 which, in one embodiment, can be modeled as an L-symbol long FIR-type channel.

At the receiver 50, the analog signal from the channel is input to Rx front end circuitry 52 which demodulates and samples the received signal to generate received samples y(k) 54. The samples are then input to an inner decoder 56. An example of an inner decoder is an equalizer which compensates for the ISI caused by the delay and time spreading of the channel. The function of the equalizer is to attempt to detect the symbols that were originally transmitted by the modulator.

Note that the equalizer may be adapted to output soft symbol values, e.g., a SOVA or MAP based equalizer. Alternatively, it may be adapted to output hard symbol decisions, e.g., a maximum likelihood sequence estimation (MLSE) based equalizer that utilizes the well known Viterbi Algorithm (VA), linear equalizer and decision feedback equalizer (DFE). In this case, soft decisions must be generated from the hard decisions. A technique for generating the soft decisions is described in U.S. Pat. No. 5,457,704 to Hoeher et al., entitled "Post Processing Method and Apparatus for Symbol Reliability Generation," incorporated herein by reference in its entirety. Another suitable soft symbol generation technique is described in U.S. Pat. No. 6,731,700, to Yakhnich et al., entitled "Soft Decision Output Generator," incorporated herein by reference in its entirety.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM and GERAN systems.

The MLSE technique is a nonlinear equalization technique which is applicable when the radio channel can be modeled as a Finite Impulse Response (FIR) system. Such a FIR system requires knowledge of the channel impulse response tap values. The channel estimate is obtained using a known training symbol sequence to estimate the channel impulse response. Other equalization techniques such as DFE or linear equalization require precise knowledge of the channel.

The channel estimation 68 is operative to generate a channel estimate h(k) that is used by the inner decoder 56 (i.e. equalizer). The channel estimation is generated using the received input samples y(k) 54 and the training sequence f(k).

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

Another channel estimation technique suitable for use with the present invention is described in the Yakhnich et al. reference entitled "Method of Channel Order Selection and Channel Order Estimation in a Wireless Communication System" cited supra.

For purposes of the invention, it is assumed that soft symbol values 58 are available at the output of the inner decoder 56. Preferably, the soft symbol values are in the form of Log Likelihood Ratio (LLR) values, i.e. $LLR(s_k)$. Note that a hard decision is one of the possible values a symbol s(k) can take. A soft decision, in the ideal case, comprises the reliabilities of each possible symbol value. The soft decision comprises a complete information packet that is needed by the decoder. An information packet is defined as the output generated by a detector or decoder within a single operation (See "Optimum Soft-Output Detection for Channels with Intersymbol Interference," Y. Li, B. Vucetic, Y. Sato, IEEE Transactions on Information Theory, Vol. 41, No. 3, May 1995).

The soft symbol values are input to the soft symbol to soft bit converter 60 of the present invention. The converter is operative to convert the soft symbol information into soft bit information. The soft bit values for a symbol are derived by obtaining the conditional probability of a bit in terms of the probability of a symbol. The soft bit decision is calculated in the form of the log likelihood ratio (LLR) of the conditional probability.

The soft bit decision information, e.g., $LLR(b_k)$, output of the converter 60 is input to the bit-wise interleaver 62. The output of the de-interleaver comprises the soft bit values in the original bit order. The de-interleaved soft bit values are then input to the outer decoder 64 which comprises a soft input decoder. The outer decoder functions to locate and fix errors using the redundancy bits inserted by the encoder. The outer decoder 64 generates the binary receive data utilizing the soft bit input. Examples of the outer decoder 64 include convolutional decoders utilizing the Viterbi Algorithm, etc. Soft decision Viterbi decoders have the advantage of efficiently processing soft decision information and providing optimum performance in the sense of minimum sequence error probability.

Figure 3:
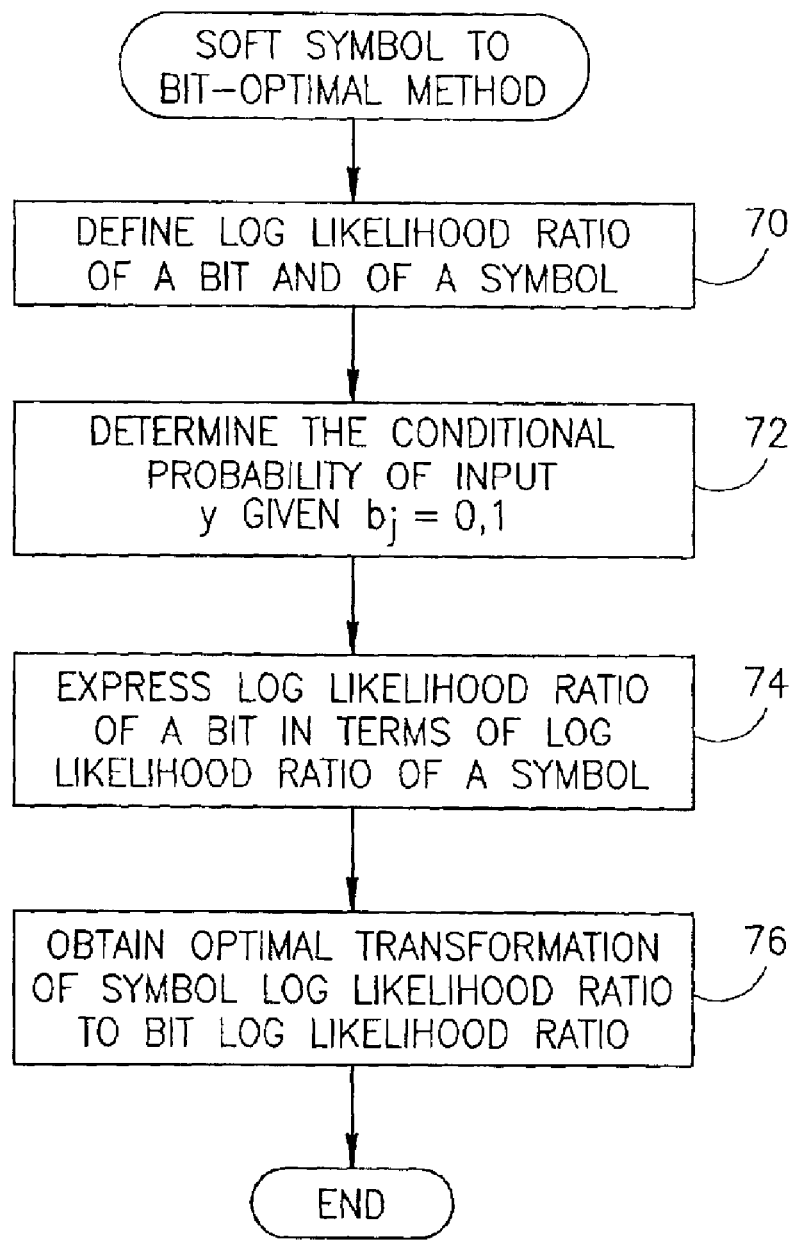
FIG. 3 is a flow diagram illustrating the first soft decision symbol to bit method of the present invention.

The first soft decision symbol to bit method of the invention will now be described in more detail. A flow diagram illustrating the first soft decision symbol to bit method of the present invention is shown in FIG. 3. The method described herein is performed by the soft symbol to soft bit converter 60 (FIG. 2). It is assumed that an M-ary modulation scheme is used, with $M=2^m$ and having the alphabet $$A = \{A_0, A_1, \ldots A_{M-1}\}$$

Each symbol can then be represented by m number of bits. The modulation scheme used in GSM EDGE and GSM EDGE Radio Access Network (GERAN) systems is 8-PSK with m=3.

The log likelihood ratio of a bit $b_k$ is defined as $$LLR(b_k) = \ln\left[\frac{P(y|b_k = 1)}{P(y|b_y = 0)}\right] \quad (1)$$

and the log likelihood ratio of a symbol $s_k$ having the value $A_i$ is defined as (step 70)

$$LLR(s_k = A_i) = \ln\left[\frac{P(y|s_k = A_i)}{P(y|s_k = A_0)}\right] \quad (2)$$

The soft output equalizer produces at each time k for symbol $s_k$ a soft output consisting of M symbol values. Alternatively, the soft output equalizer can produce M−1 soft symbol values wherein the $M^{th}$ symbol value is a reference symbol that is implied by the converter.

Each soft symbol value comprises the $LLR(s_k = A_i)$ (or an approximation thereof) for i=1, . . . , M−1. The converter, utilizing the method of the present invention, processes these values for each time k and transforms them to Log Likelihood Ratios of m bits representing that symbol. The resultant bit Log Likelihood Ratios, defined in Equation 1, can subsequently be used to perform optimal decoding of forward error correction (FEC) codes.

Next, the conditional probability of the input y is determined given a bit is equal to a zero and a one (step 72). Let it be defined that symbol $s_k$ consists of m bits denoted by $b_j$ for j=0, ..., m−1. The probability of input y given $b_j=1$ can be expressed as $$P(\underline{y}|b_j = 1) = \frac{P(b_j = 1, \underline{y})}{P(b_j = 1)} \quad (3)$$

$$= \frac{\sum_{l \in D_{j1}} P(s_k = A_l, \underline{y})}{P(b_j = 1)}$$

$$= \frac{\sum_{l \in D_{j1}} P(\underline{y}|s_k = A_l)P(s_k = A_l)}{P(b_j = 1)}$$

$$= \frac{1}{P(b_j = 1)} \sum_{l \in D_{j1}} P(\underline{y}|s_k = A_l)P(s_k = A_l)$$

where $\underline{y}$ is a vector representation of the input;
$s_k$ represents the $k^{th}$ symbol;
$A_l$ represents the symbol value;
$b_j$ represents the $j^{th}$ bit of the symbol;
$D_{j0}$ and $D_{j1}$ represent the set of symbols wherein $b_j=0$ and 1, respectively;
$\forall l \in D_{j1}$ and $b_j(A_l)=i$ for $i=0, 1$; $j=0, ..., m-1$; $l=0, ..., M-1$.

A reasonable assumption can be made that the a priori probability of symbols and bits are equal (this is a valid assumption for most practical communication systems).

$$P(s_k = A_l) = \frac{1}{M}, \forall l \quad (4)$$

$$P(b_j = 0) = P(b_j = 1) = \frac{1}{2}$$

Therefore, the following expression for the conditional probability of the input as expressed in Equation 3 can be rewritten in terms of Equation 4.

$$P(\underline{y}|b_j = 1) = \frac{2}{M} \sum_{l \in D_{j1}} P(\underline{y}|s_k = A_l) \quad (5)$$

Similarly, $$P(\underline{y}|b_j = 0) = \frac{2}{M} \sum_{l \in D_{j0}} P(\underline{y}|s_k = A_l) \quad (6)$$

Then, the bit Log Likelihood Ratio (LLR) as defined above in Equation 1 can be expressed as follows (step 74)

$$LLR(b_j) = \ln\left(\frac{P(\underline{y}|b_j = 1)}{P(\underline{y}|b_j = 0)}\right) \quad (7)$$

$$= \ln(P(\underline{y}|b_j = 1)) - \ln(P(\underline{y}|b_j = 0))$$

$$= \{\ln(P(\underline{y}|b_j = 1)) - \ln(P(\underline{y}|s_k = A_0))\} -$$
$$\{\ln(P(\underline{y}|b_j = 0)) - \ln(P(\underline{y}|s_k = A_0))\}$$

$$= \ln\left(\frac{P(\underline{y}|b_j = 1)}{P(\underline{y}|s_k = A_0)}\right) - \ln\left(\frac{P(\underline{y}|b_j = 0)}{P(\underline{y}|s_k = A_0)}\right) =$$

$$= \ln\left(\frac{\sum_{l \in D_{j1}} P(\underline{y}|s_k = A_l)}{P(\underline{y}|s_k = A_0)}\right) - \ln\left(\frac{\sum_{l \in D_{j0}} P(\underline{y}|s_k = A_l)}{P(\underline{y}|s_k = A_0)}\right)$$

$$= \ln\left(\sum_{l \in D_{j1}} \frac{P(\underline{y}|s_k = A_l)}{P(\underline{y}|s_k = A_0)}\right) - \ln\left(\sum_{l \in D_{j0}} \frac{P(\underline{y}|s_k = A_l)}{P(\underline{y}|s_k = A_0)}\right)$$

Substituting Equation 2 into Equation 7 yields an optimal transformation of symbol LLR to bit LLR (step 76)

$$LLR(b_j) = \ln\left(\sum_{l \in D_{j1}} e^{LLR(s_k = A_l)}\right) - \ln\left(\sum_{l \in D_{j0}} e^{LLR(s_k = A_l)}\right) \quad (8)$$

Thus, the log likelihood ratio for a bit is expressed as a function of the log likelihood ratios of the symbols. The soft symbol to soft bit converter is operative to generate at each time k, for symbol $s_k$, a plurality of m soft bit outputs $$LLR(b_j) i=0 \ldots m-1 \quad (9)$$

Note that the bit LLR derived using Equation 8 is the optimal transformation of symbol LLR to bit LLR. A sub-optimal expression for the bit LLR can also be derived, as described in more detail herein below. Note also that one skilled in the communication and signal processing arts can modify the present invention to generate types of soft bit output other than log likelihood ratios. Other types of soft bit output derived using the principles of the present invention are intended to be within the scope of the invention.

Figure 4:
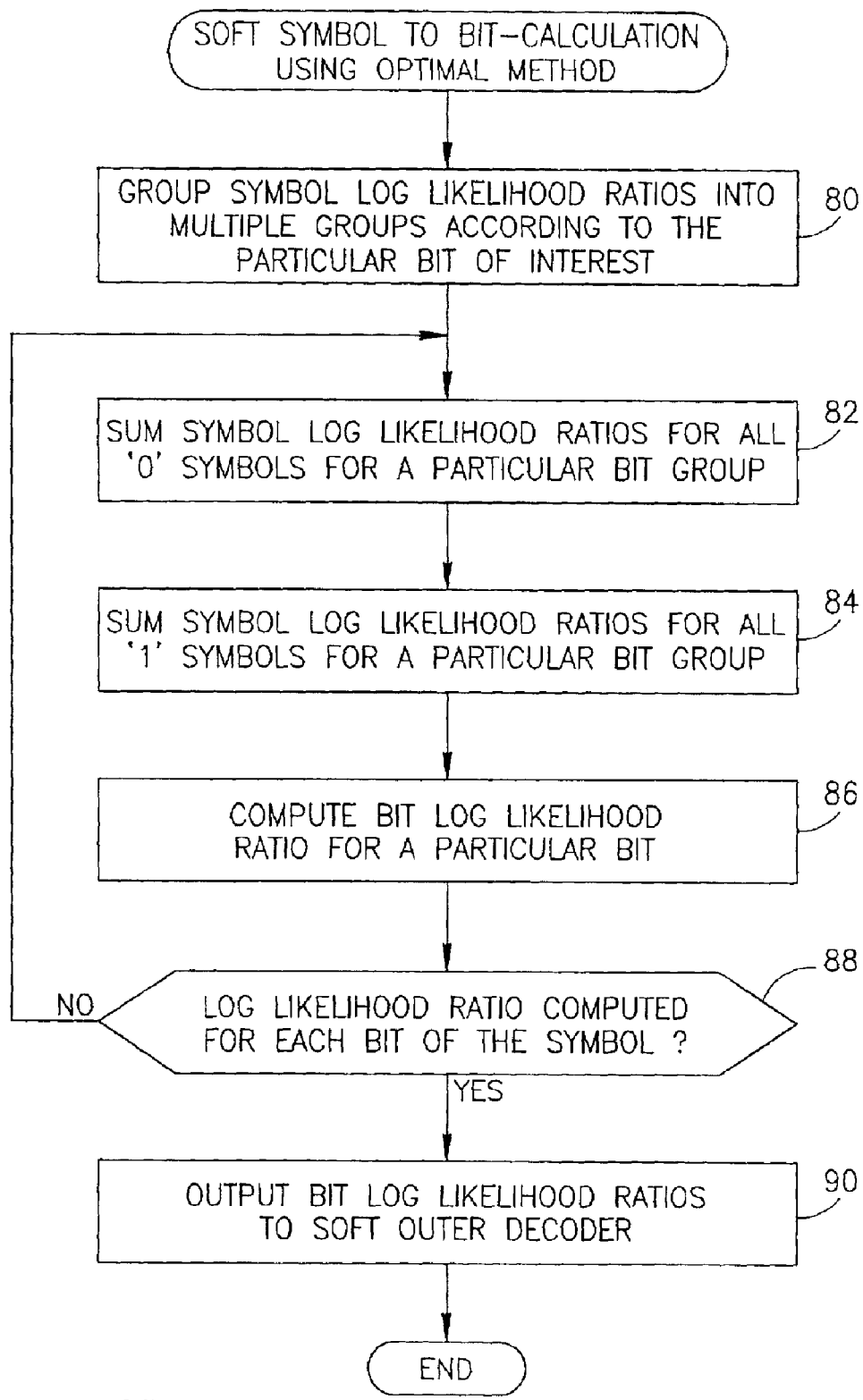
FIG. 4 is a flow diagram illustrating the calculation of soft decision bit information using the first soft decision symbol to bit method of the present invention.

The method of calculating the soft bit values will now be described in more detail. A flow diagram illustrating the calculation of soft decision bit information using the first soft decision symbol to bit method of the present invention is shown in FIG. 4. First, the symbol log likelihood ratios from the equalizer are organized into multiple groups according to the particular bit of interest and divided into a 0-bit portion and a 1-bit portion (step 80). To illustrate, consider an 8-PSK symbol used in EGPRS GSM systems wherein each symbol is represented by m=3 bits. In this case, the symbol values are organized into three bit groups as shown below in Table 1.

TABLE 1

| Symbols grouped according to bit position | | | |
|---|---|---|---|
| Bit value | Msb (j = 2) | Mid bit (j = 1) | Lsb (j = 0) |
| 0 | 000 | 000 | 000 |
|  | 001 | 001 | 010 |
|  | 010 | 100 | 100 |
|  | 011 | 101 | 110 |
| 1 | 100 | 010 | 001 |
|  | 101 | 011 | 011 |
|  | 110 | 110 | 101 |
|  | 111 | 111 | 111 |

For each bit position, the 0-bit and 1-bit symbols are grouped together. Thus, for the MSB bit position (j=2), all symbols whose MSB=0 are grouped in the upper '0' portion of the table. Similarly, all symbols whose MSB=1 are grouped in the lower '1' portion of the table. A similar process is performed for the mid bit (j=1) and LSB (j=0) positions. Although the bit representation of the symbols are shown in Table 1, in actuality, the elements of the table comprise the soft symbol values, i.e. the log likelihood ratios.

Next, for each bit position, the symbol log likelihood ratios for all symbols in the '0' partition are summed so as to yield a zero-bit sum (step 82). Similarly, the symbol log likelihood ratios for all symbols in the '1' partition are summed so as to yield a one-bit sum (step 84). The one-bit sum and zero-bit sum are inserted into Equation 8 and the log likelihood ratio for the particular bit is computed (step 86).

The process of summing the symbol log likelihood ratios for the zero and one symbols and subsequently computing the bit LLR is repeated for each bit position (step 88). The resultant bit LLRs are subsequently output to the soft outer decoder (step 90).

Alternatively, the complexity of computing the bit LLR can be reduced by performing an approximation of the symbol probabilities. The approximation takes advantage of the rapid increase of the exponential function used in Equation 8. Rather than sum all zero and one symbols for each bit position as in the method of FIG. 4, the maximum symbol value for the symbol where the bit of interest is a one and the maximum symbol value where the bit of interest is a zero is used instead.

Figure 5:
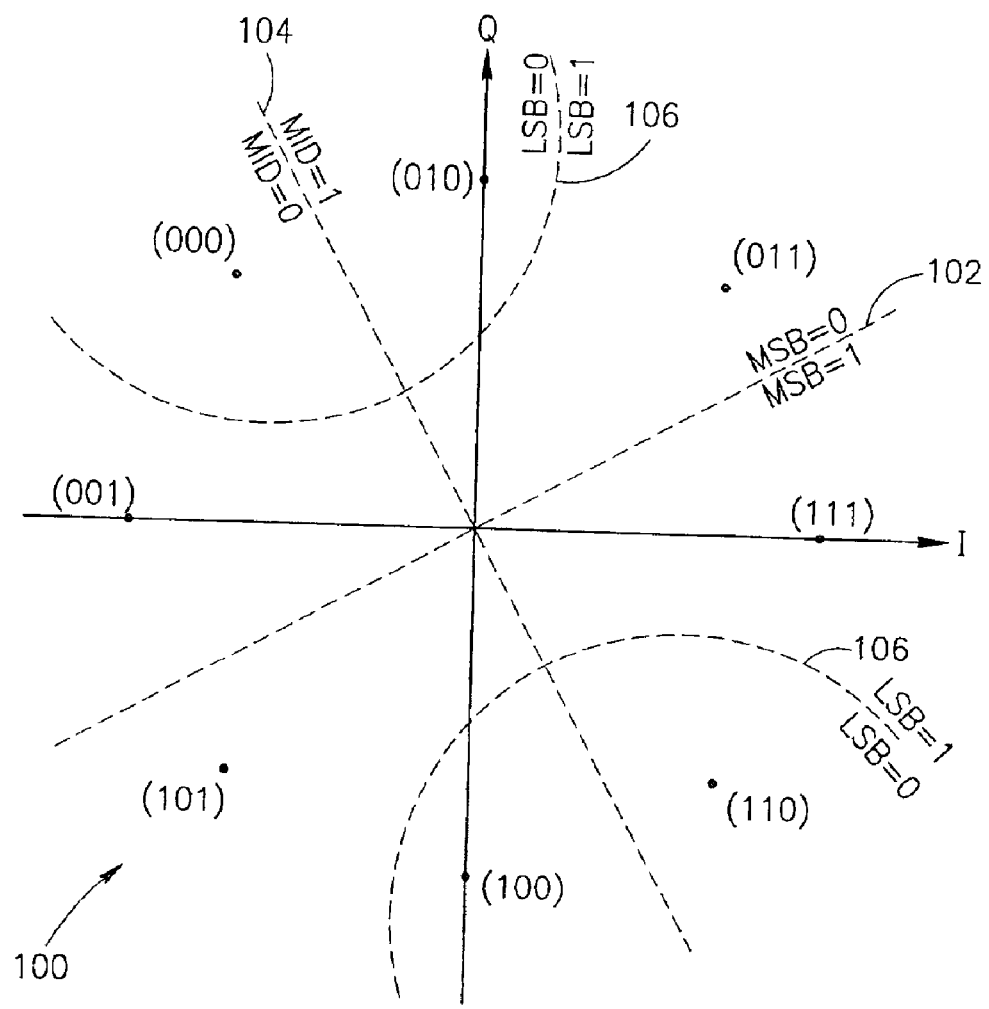
FIG. 5 is a diagram illustrating the symbol mapping of modulating bits and their arrangement into bit groups for Gray coded 8-PSK modulation.

To aid in illustrating the approximation soft bit method of the present invention, the diagram in FIG. 5 is provided that illustrates the symbol mapping of modulating bits and their arrangement into bit groups for an 8-PSK symbol as used in GSM EDGE systems. The symbol mapping diagram, generally referenced 100, is divided according to bit position. Dashed line 102 divides the 8 symbols into a group in which the MSB=0 and a group in which the MSB=1. Dashed line 104 divides the 8 symbols into a group in which the mid bit or Second Significant Bit (SSB)=0 and a group in which the mid bit=1. Dashed lines 106 divide the 8 symbols into a group in which the LSB=0 and a group in which the LSB=1.

The diagram 100 is used to determine which of the soft symbol values to use in computing the bit LLR. For each bit LLR that is to be computed, two symbol LLR values are required: one for the '0' bit and one for the '1' bit of the particular bit position of interest. Both are the maximum soft symbol values for the respective bits. The overall maximum soft symbol value is used for one of the bits while the soft symbol value of the nearest neighbor symbol whose bit is opposite to that of the overall maximum is used for the other.

To illustrate, consider the symbol '101' whose corresponding soft symbol value, denoted by $S_{101}$, is the overall maximum of all M symbols received from the equalizer. The value S101 is thus used for the maximum soft symbol value for the one-bit for bit position j=2, the zero-bit for bit position j=1 and the one-bit for bit position j=0.

For the MSB, in accordance with the method, the zero-symbol value is the maximum of all symbols whose MSB=0. The symbol most likely to yield the maximum value is the symbol closest to symbol 101 whose MSB=0. From the diagram in FIG. 5, this symbol is symbol 001. Thus, the soft symbol value of the 001 symbol is taken as the maximum zero-symbol value. In similar fashion, the nearest neighbor for the middle bit is symbol 110 and for the LSB is symbol 100.

The nearest neighbors can be precalculated in accordance with the modulation scheme and the number of symbols in the constellation. To illustrate, the complete list of nearest neighbors for the GSM modulation of 8-PSK is presented below in Table 2.

TABLE 2

Nearest neighbors for GSM 8-PSK modulation

| Reference Symbol (Most Likely Symbol) | Msb (j = 2) | Mid bit (j = 1) | Lsb (j = 0) |
|---|---|---|---|
| 000 | 101 | 010 | 001 |
| 001 | 101 | 010 | 000 |
| 010 | 111 | 000 | 011 |
| 011 | 111 | 000 | 010 |
| 100 | 001 | 110 | 101 |
| 101 | 001 | 110 | 100 |
| 110 | 011 | 100 | 111 |
| 111 | 011 | 100 | 110 |

Thus, for each symbol, only m+1 soft symbol values (the hard decision and m soft symbols) are required which results in reduced complexity for the equalizer and the soft symbol to soft bit converter. Note that m+1 soft symbol values are needed when the symbol conditional probabilities are referenced to the $A_0$ symbol. If the conditional probabilities are referenced to the hard decision instead, only m soft symbols are required which reduces the data to be passed to the soft symbol to soft bit converter.

Further, the table comprises M rows when the symbol conditional probabilities are referenced to an arbitrary constant (i.e. not a symbol). If the conditional probabilities are referenced to a symbol (e.g., $A_0$), only M−1 rows are needed. In the latter case, the LLR of the A=0 symbol is implied to equal zero.

Figure 6:
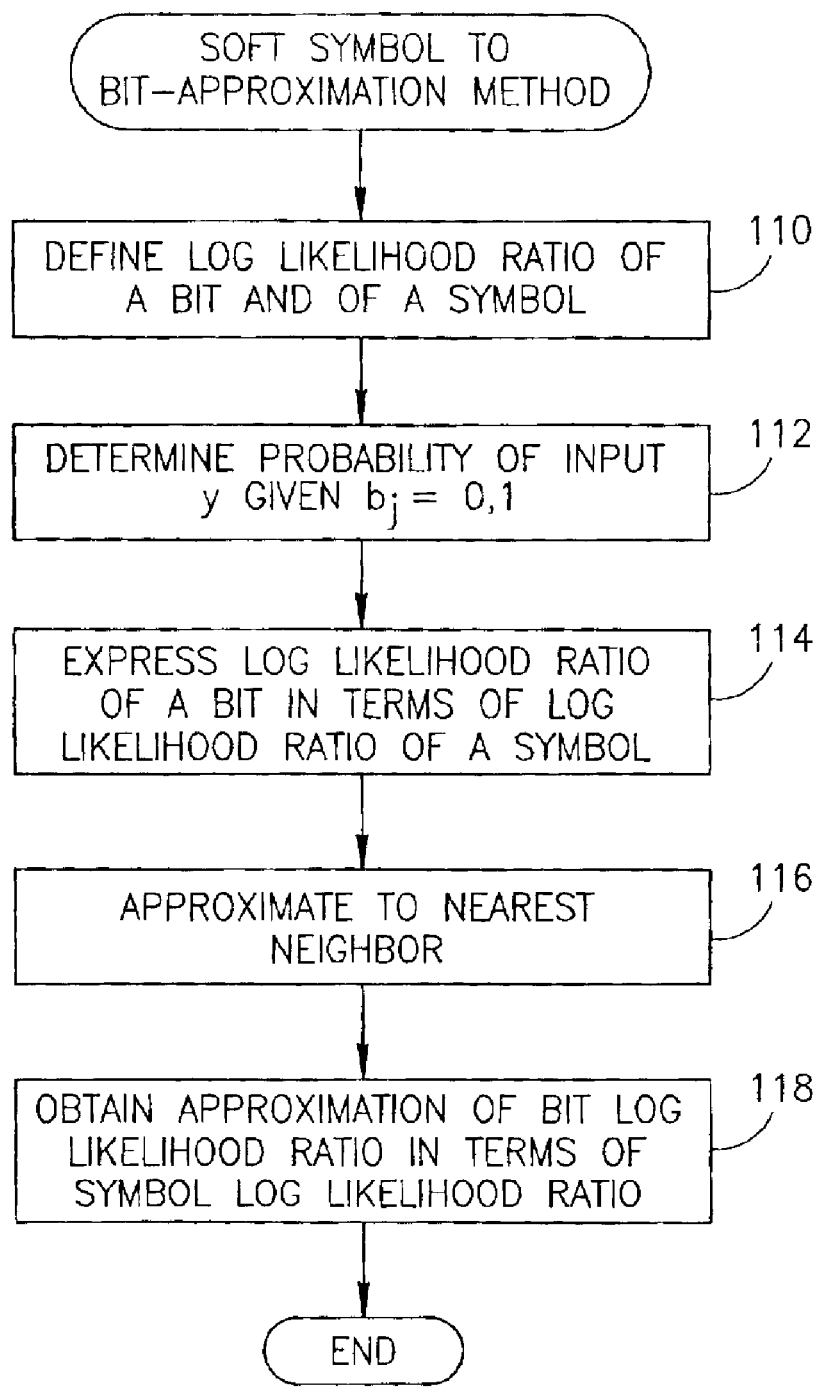
FIG. 6 is a flow diagram illustrating the second soft decision symbol to bit method of the present invention.

A flow diagram illustrating the second soft decision symbol to bit method of the present invention is shown in FIG. 6. The log likelihood ratio for a bit is defined as expressed above in Equation 1 and for a symbol as in Equation 2 (step 110). The conditional probability of the input y given a one or a zero bit is determined as expressed in Equation 3 above (step 112).

As above, it is assumed that a priori probability of symbols and bits are equal allowing the expression for the conditional probability of the input to be rewritten as in Equations 5 and 6. The bit Log Likelihood Ratio (LLR) as defined above in Equation 2 is determined as expressed in Equation 10 (step 114).

$$LLR(b_j) = \ln\left(\sum_{l \in D_{j1}} P \frac{(y|s_k = A_l)}{P(y|s_k = A_0)}\right) - \ln\left(\sum_{l \in D_{j0}} P \frac{(y|s_k = A_l)}{P(y|s_k = A_0)}\right) \quad (10)$$

Consider the following which embodies the nearest neighbor approximation $$\ln\left(\frac{P(y|s_k = A_l)}{P(y|s_k = A_0)}\right) > \ln\left(\frac{P(y|s_k = A_n)}{P(y|s_k = A_0)}\right) \Rightarrow \quad (11)$$

$$\frac{P(y|s_k = A_l)}{P(y|s_k = A_0)} \gg \frac{P(y|s_k = A_n)}{P(y|s_k = A_0)}$$

where n represents the second largest soft symbol after the maximum. Due to the rapidly increasing exponential functions in the expression for the bit LLR, the maximum symbol value is by far the most dominant probability and the remaining $$\frac{M}{2} - 1$$

soft symbol values can be ignored. Therefore, the following approximation is valid (step 116)

$$\ln\left(\sum_{l \in D_{j1}} \frac{P(y|s_k = A_l)}{P(y|s_k = A_0)}\right) \approx \max_{l \in D_{j1}}\left(\ln\left(\frac{P(y|s_k = A_l)}{P(y|s_k = A_0)}\right)\right) \quad (12)$$

Thus, the maximum symbol values are substituted for the zero-symbol and one-symbol sums. Substituting Equation 12 into Equation 10 yields $$LLR(b_j) \approx \max_{l \in D_{j1}}\left(\ln\left(\frac{P(y|s_k = A_l)}{P(y|s_k = A_0)}\right)\right) - \max_{l \in D_{j0}}\left(\ln\left(\frac{P(y|s_k = A_l)}{P(y|s_k = A_0)}\right)\right) \quad (13)$$

Further substituting Equation 2 into Equation 13 yields an approximation of the transformation of symbol LLR to bit LLR (step 118).

$$LLR(b_j) \approx \max_{l \in D_{j1}}(LLR(s_k = A_l)) - \max_{l \in D_{j0}}(LLR(s_k = A_l)) \quad (14)$$

Thus, the log likelihood ratio for a bit can be approximated as the difference between a soft symbol value wherein the bit of interest is a one and a soft symbol value wherein the bit of interest is a zero.

Figure 7:
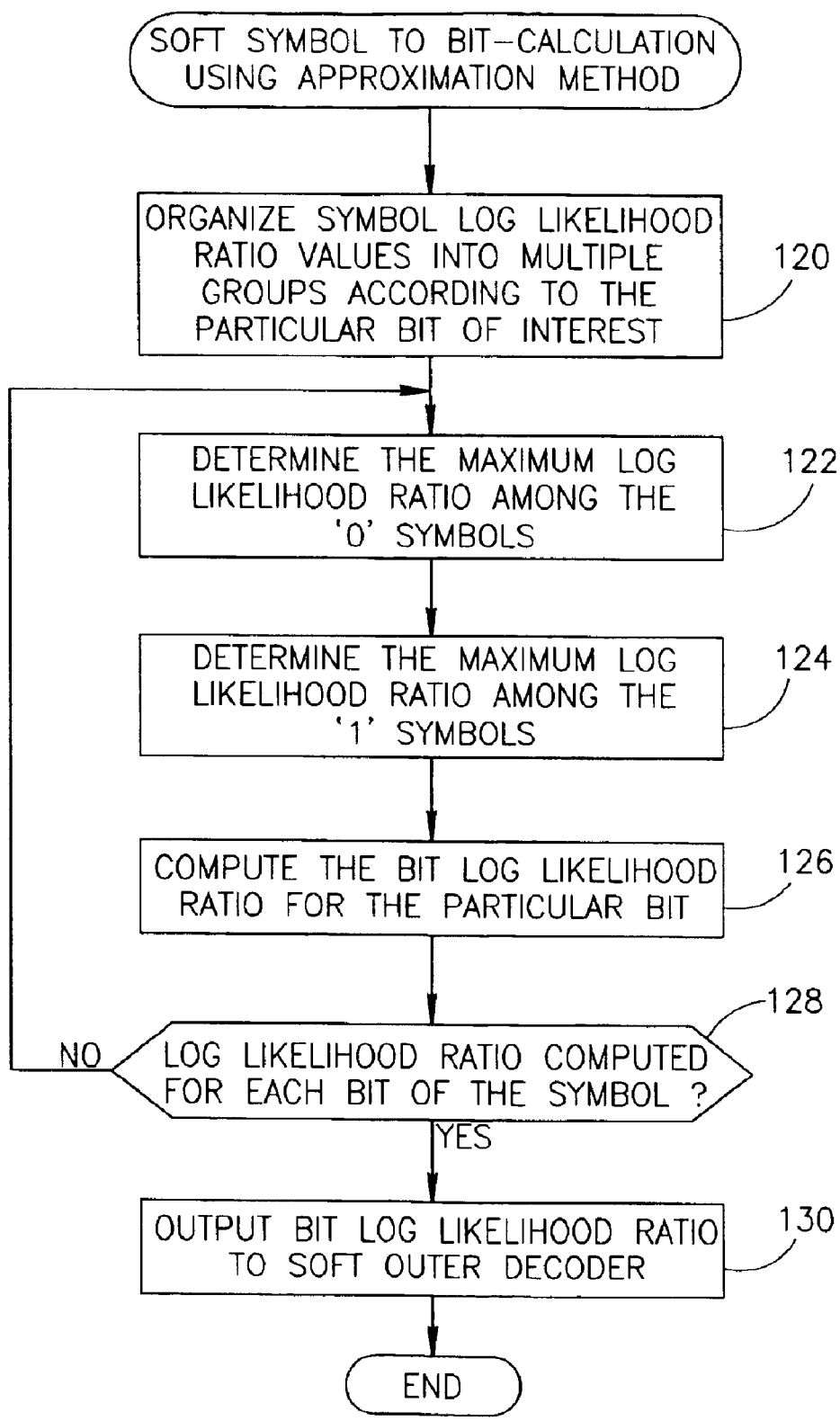
FIG. 7 is a flow diagram illustrating the calculation of soft decision bit information using the second soft decision symbol to bit method of the present invention.

A flow diagram illustrating the calculation of soft decision bit information using the second soft decision symbol to bit method of the present invention is shown in FIG. 7. The symbol log likelihood ratio values are organized into groups according to bit position, in similar fashion to the optimal method described above in connection with FIG. 4 and as shown in Table 1 (step 120). Note that this method assumes that all the soft symbol values for a symbol are received from the equalizer.

For each of the m bit positions, the maximum soft symbol value from among the symbols whose bit of interest equals zero is determined (step 122). Likewise, the maximum soft symbol value from among the symbols whose bit of interest equals one is also determined (step 124). The log likelihood ratio for the particular bit is computed using the two maximum soft symbol values (step 126). A bit log likelihood ratio value is computed for each bit of the symbol (step 128). The resultant bit LLRs are subsequently output to the soft outer decoder (step 130).

In an alternative embodiment, fewer soft symbol values are required from the equalizer. As described above, only m+1 rather than M soft symbol values are required to compute the bit log likelihood ratios. For each symbol, the overall maximum soft symbol value from among all the symbol values is required along with an additional m soft symbol values. The additional m soft symbol values correspond to the nearest neighbors having a bit opposite to that of the symbol corresponding to the maximum soft symbol value. For the case of 8-PSK, the required symbol values are as listed in Table 2 above.

It is noted that other approximations to find the log likelihood ratio are also possible, in addition to that described above. The approximation described above attempts to determine $$\log\left(\sum \frac{P_A}{P_B}\right)$$

when only the ratios $$\log\left(\frac{P_A}{P_B}\right)$$

are available. The ratios were expressed as $$\log\left[\sum e^{\log\left(\frac{P_A}{P_B}\right)}\right]$$

in order to approximate the sum by the maximal term (see Equation 12). Another type of approximation suitable for use with the present invention can be expressed as $$\log\left[e^{\log\left(\frac{P_1}{P_0}\right)} + e^{\log\left(\frac{P_2}{P_0}\right)}\right] \approx \quad (15)$$

$$\max\left[\log\left(\frac{P_1}{P_0}\right), \log\left(\frac{P_2}{P_0}\right)\right] + f\left[\log\left(\frac{P_1}{P_0}\right) - \log\left(\frac{P_2}{P_0}\right)\right]$$

wherein the first term represents the Max-Log approximation while the second term is a refinement. The refinement can be expressed as $$f(|x|) = \log(1 + e^{-|x|}) \quad (16)$$

Both the Max-Log approximation and the refinement may be applied to the method of converting soft symbols to soft bits described herein.

The invention provides several advantages. A key advantage is that a bit-wise or symbol-wise interleaver can be used in the system while nevertheless providing soft bit information to a soft input FEC decoder, e.g., soft decoder for turbo codes, convolutional codes, etc. Another advantage of the invention is that the conversion of soft symbols to soft bits is independent of the type of equalizer used in the receiver so long as soft symbol values are generated. Another benefit is that both the optimal and the approximate methods are computationally efficient in that a minimum number of arithmetic operations are required for their implementation. In addition, the method does not require any additional memory for storage of past or future data.

GSM EDGE Embodiment

Figure 8:
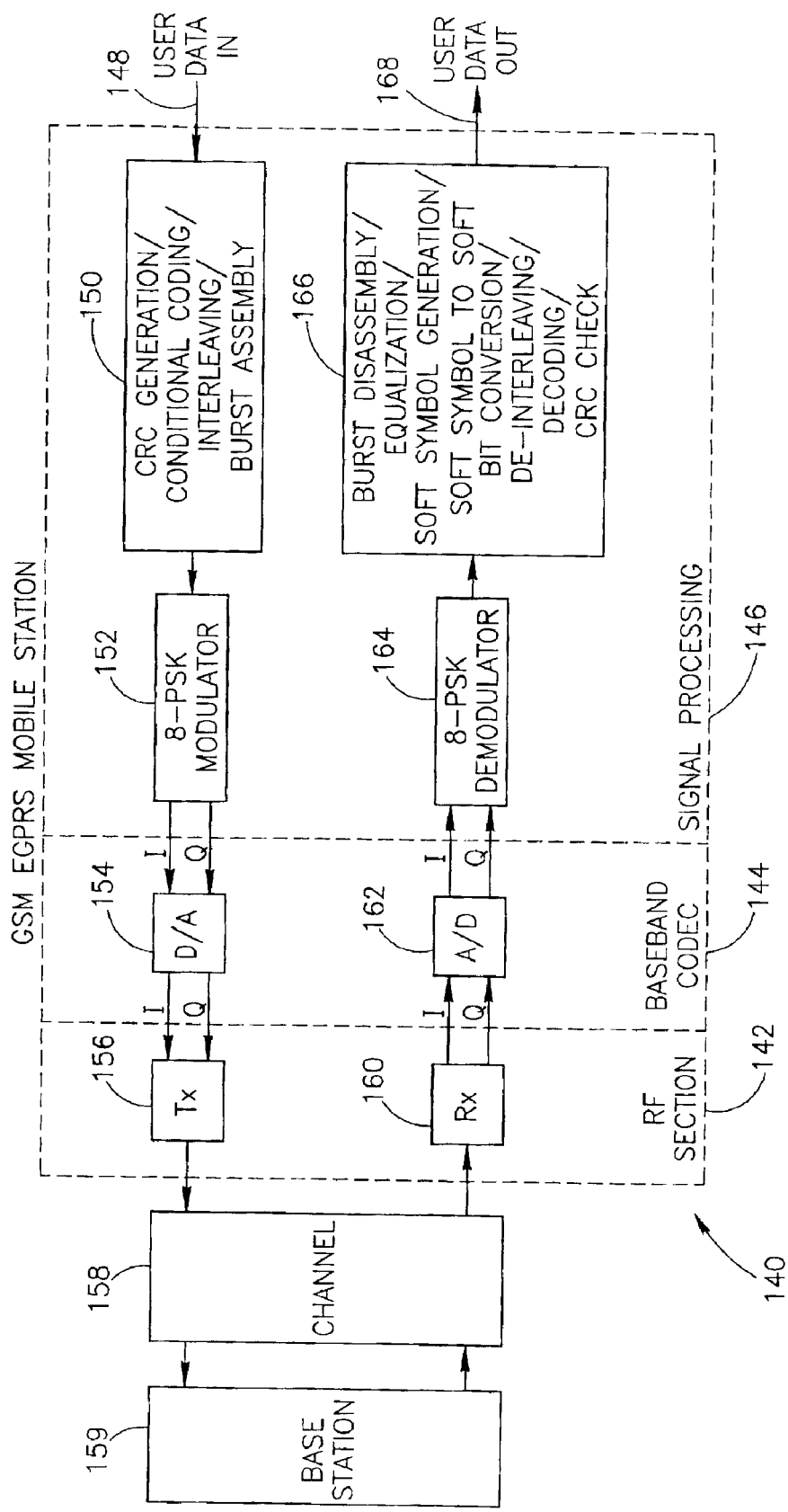
FIG. 8 is a block diagram illustrating the functional processing blocks in a GSM EGPRS mobile station.

A GSM EGPRS mobile station constructed to comprise means for performing the soft symbol to soft bit conversion method of the present invention is presented. A block diagram illustrating the functional processing blocks in a GSM EGPRS mobile radio station is shown in FIG. 8. The radio station is designed to provide reliable data communications at rates of up to 384 kbit/s. The GSM EGPRS mobile station, generally referenced 140, comprises a transmitter and receiver divided into the following sections: signal processing circuitry 146, baseband codec 144 and RF circuitry section 142.

In the transmit direction, the signal processing portion functions to protect the data so as to provide reliable communications from the transmitter to the base station 159 over the channel 158. Several processes performed by the channel coding block 150 are used to protect the user data 148 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 152 which may be implemented as a 3π/8 offset 8-PSK modulator.

In the receive direction, the output of the baseband codec is demodulated using a complementary 8-PSK demodulator 164. Several processes performed by the channel decoding block 166 in the signal processing section are then applied to the demodulated output. The processes performed include burst disassembly, equalization, soft symbol generation, soft symbol to soft bit conversion in accordance with the present invention, de-interleaving, convolutional decoding and CRC check.

The baseband codec converts the transmit and receive data into analog and digital signals, respectively, via D/A converter 154 and A/D converter 162. The transmit D/A converter provides analog baseband I and Q signals to the transmitter 156 in the RF circuitry section. The I and Q signals are used to modulate the carrier for transmission over the channel.

In the receive direction, the signal transmitted by the base station over the channel is received by the receiver circuitry 160. The analog signals I and Q output from the receiver are converted back into a digital data stream via A/D converter 162. This I and Q digital data stream is filtered and demodulated by 8-PSK demodulator 164 before being input to the channel decoding block 166. Several processes performed by signal processing block 146 are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the method of the present invention, a GSM Enhanced General Packet Radio System (EGPRS) was simulated and the results are presented herein. The simulation was performed assuming a GSM EGPRS transmitter and static channel with punctured rate ⅓ convolutional coding.

Figure 9:
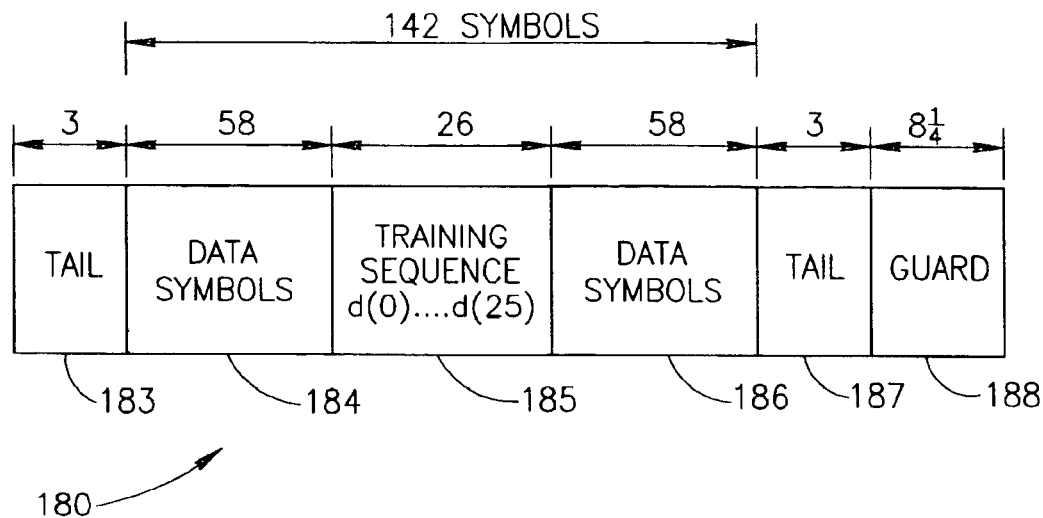
FIG. 9 is a diagram illustrating the elements of a GSM burst including tail, data and training symbols.

The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 9.

In GSM, the training sequence is sent in the middle of each burst. Each fixed length burst 180 consists of 142 symbols preceded by a 3 symbol tail 183 and followed by a 3 symbol tail 187 and 8.25 symbol guard 188. The 142 symbols include a 58 symbol data portion 184, 26 symbol training sequence 185 and another 58 symbol data portion 186. Since the training sequence is sent in the middle of the burst, it is referred to as a midamble. It is inserted in the middle of the burst in order to minimize the maximum distance to a data bit thus minimizing the time varying effects at the ends of the burst.

The burst is then modulated using $3\pi/8$-offset 8-PSK with Gaussian pulse shaping in accordance with the GSM standard. The modulated output is transmitted over a frequency selective static Gaussian channel utilizing punctured rate ⅓ convolutional coding. An equalizer operative to generate soft symbol values was used in the receiver. The receiver was adapted to convert the soft symbol information into soft bit information in accordance with the method of the present invention. A soft input Viterbi Algorithm based convolutional decoder was used as the outer decoder. The soft bit values output from the converter were used as input for the soft decoder.

Figure 10:
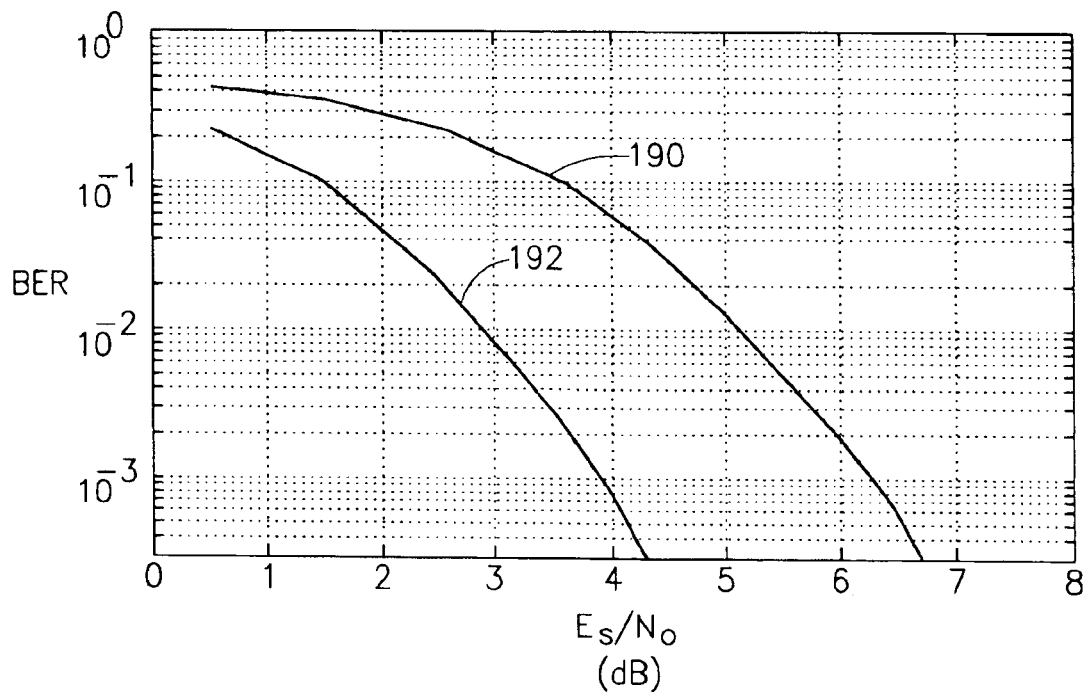
FIG. 10 is a graph illustrating BER at the output of the outer decoder versus SNR for a concatenated communications receiver constructed with and without the soft decision symbol to bit converter of the present invention.

A graph illustrating BER at the output of the outer decoder versus SNR for a concatenated communications receiver constructed with and without the soft decision symbol to bit converter of the present invention is shown in FIG. 10. The solid curve 190 represents the BER at the output of the outer decoder when hard decisions only were used by the decoder. The solid curve 192 represents the BER versus SNR when soft bit decisions computed from the soft symbol decision information were used by the decoder. It can be seen that performance gains of over 2 dB can be achieved using the present invention when compared to hard decision decoding. For example, at a BER of $10^{-3}$, a performance gain of approximately 2.5 dB is achieved when using the soft decision information.

Computer Embodiment

Figure 11:
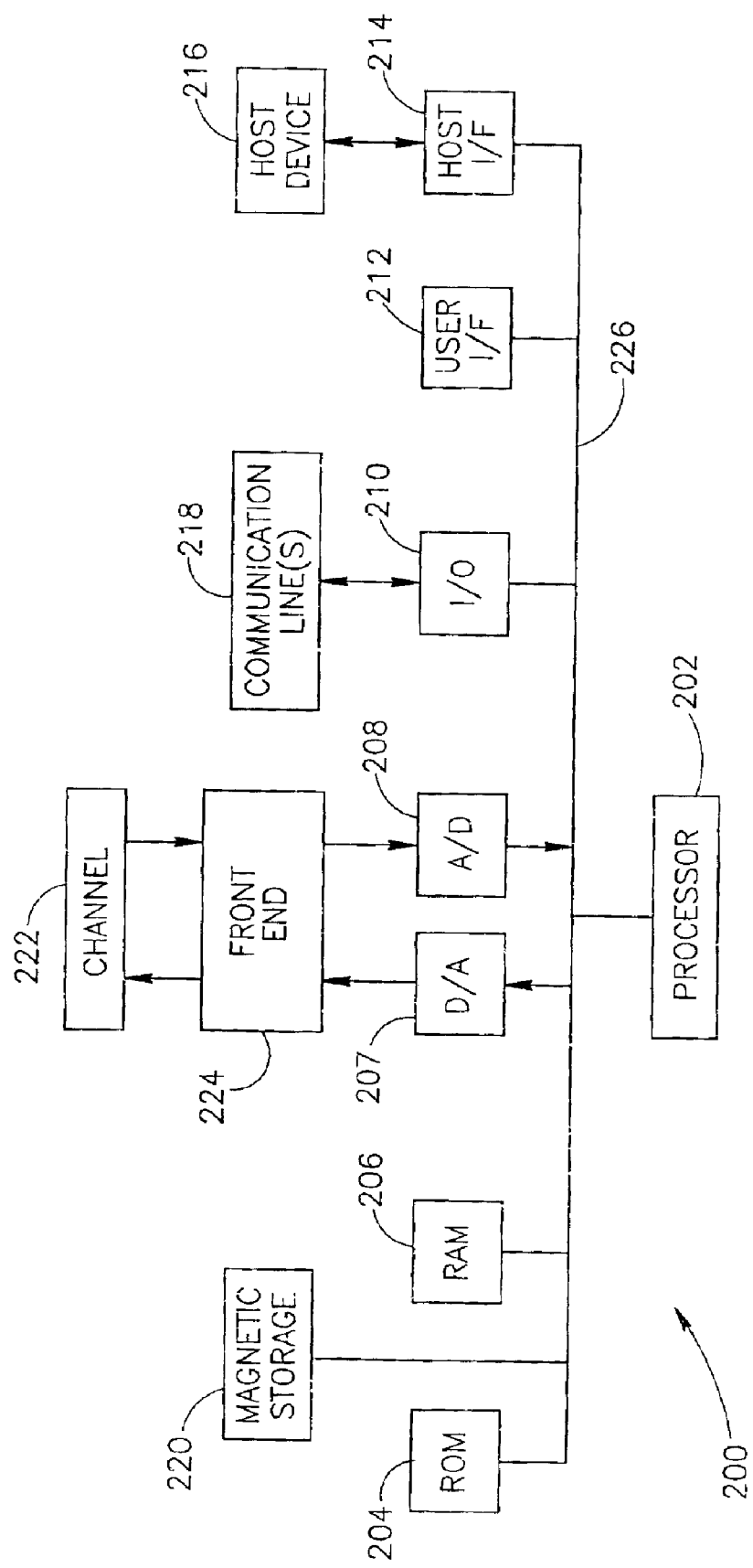
FIG. 11 is a block diagram illustrating an example computer processing system adapted to perform the first and second soft decision symbol to bit conversion method of the present invention.

In another embodiment, a computer is operative to execute software adapted to perform the soft symbol to soft bit conversion method of the present invention. A block diagram illustrating an example computer processing system adapted to perform the soft decision symbol to bit conversion methods of the present invention is shown in FIG. 11. The system may be incorporated within a communications device such as a receiver part of which is implemented in software.

The computer system, generally referenced 200, comprises a processor or central processing unit (CPU) 202 such as a digital signal processor (DSP), static read only memory 204 and dynamic main memory 206 all in communication with the processor which may comprise a microcontroller, microprocessor or microcomputer. The processor is also in communication, via a bus 226, with a number of peripheral devices that are also included in the computer system. An A/D converter 208 functions to sample the baseband signal output of the front end 224 coupled to the channel 222. Samples generated by the processor are input to the front end via D/A converter 207.

One or more communication lines 218 are connected to the system via I/O interface 210. A user interface 212 responds to user inputs and provides feedback and other status information. A host interface 214 connects a host device 216 to the system. The host is adapted to configure, control and maintain the operation of the system. The system also comprises magnetic storage device 220 for storing application programs and data. The system comprises computer readable storage medium which may include any suitable memory means including but not limited to magnetic storage, optical storage, semiconductor volatile or non-volatile memory, biological memory devices, or any other memory storage device.

The soft symbol to soft bit conversion software is adapted to reside on a computer readable medium, such as a magnetic disk within a disk drive unit. Alternatively, the computer readable medium may comprise a floppy disk, Flash memory card, EEPROM based memory, bubble memory storage, ROM storage, etc. The software adapted to perform the soft symbol to soft bit conversion method of the present invention may also reside, in whole or in part, in the static or dynamic main memories or in firmware within the processor of the computer system (i.e. within microcontroller, microprocessor or microcomputer internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of generating soft bit outputs from soft symbol decisions for an M-ary symbol alphabet in a communication receiver coupled to a channel wherein said communication receiver includes a first decoder adapted to generate said soft symbol decisions from a received signal, said method comprising the steps of:
   receiving M soft symbol decisions for each symbol, wherein each symbol is represented by m bits;
   partitioning said soft symbol decisions into m bit groups, each said bit group comprising a zero-bit portion and a one-bit portion;
   summing all soft symbol values in the zero-bit portion of a particular bit group of interest, so as to generate a first sum;
   summing all soft symbol values in the one-bit portion of a particular bit group of interest, so as to generate a second sum;
   computing a soft bit value for the particular bit of interest as a function of said first sum and said second sum; and
   wherein m and M are positive integers.

2. The method according to claim 1, wherein said communications receiver is adapted to receive and decode a global system for mobile communication (GSM) signal.

3. The method according to claim 1, wherein said communications receiver is adapted to receive and decode a GSM EDGE Radio Access Network (GERAN) system signal.

4. The method according to claim 1, further comprising the step of providing a second decoder operative to generate receive binary data in accordance with said soft bit output values.

5. The method according to claim 4, wherein said second decoder comprises a convolutional decoder based on the Viterbi Algorithm (VA).

6. The method according to claim 1, wherein said M-ary symbol comprises an 8-PSK symbol.

7. The method according to claim 1, wherein said step of computing comprises generating said soft bit values represented as bit log likelihood ratios (LLRs).

8. The method according to claim 1, wherein said soft symbol values are represented as symbol log likelihood ratios (LLRs).

9. The method according to claim 1, wherein said zero-bit portion comprises those soft symbol decisions that correspond to those symbols having a zero bit in the particular bit position of interest.

10. The method according to claim 1, wherein said one-bit portion comprises those soft symbol decisions that correspond to those symbols having a one bit in the particular bit position of interest.

11. The method according to claim 1, wherein said first decoder comprises a maximum likelihood sequence estimation (MLSE) equalizer based on the Soft Output Viterbi Algorithm (SOVA).

12. The method according to claim 1, wherein said first decoder comprises means for performing maximum a posterior (MAP) algorithm.

13. The method according to claim 1, wherein said soft bit values are generated in accordance with the function given by $$LLR(b_j) = \ln\left(\sum_{l \in D_{j1}} e^{LLR(s_k = A_l)}\right) = \ln\left(\sum_{l \in D_{j0}} e^{LLR(s_k = A_l)}\right)$$

wherein $LLR(s_k = A_l)$ is the log likelihood ratio of symbol $s_k = A_l$, $A_l$ represents the symbol value, $b_j$ represents the $j^{th}$ bit of the symbol, $D_{j0}$ and $D_{j1}$ represent the set of symbols wherein bit j=0 and 1, respectively, $\forall l \in D_{ji}$ and $b_j(A_l) = i$ for i=0, 1; j=0, ..., m−1; l=0, ..., M−1.

14. The method according to claim 13, further comprising the step of outputting said soft bit values to a soft second decoder for decoding into binary data therefrom.

15. The method according to claim 1, further comprising the step of outputting said soft bit values to a de-interleaver whose output is subsequently input to a soft second decoder for decoding into binary data therefrom.

16. The method according to claim 1, wherein said M soft symbol decisions for each symbol comprise M−1 soft symbol decisions and an implied reference symbol.

17. The method according to claim 1, wherein said step of computing comprises computing a Max-Log approximation with a refinement.

18. A method of generating soft bit outputs from soft symbol values for an M-ary symbol alphabet, said method comprising the steps of:
   receiving for each symbol m+1 soft symbol values represented as symbol log likelihood ratios wherein each symbol is represented by m bits, and wherein said m+1 soft symbol values comprise a first soft symbol value corresponding to a most likely symbol and m second soft symbol values, wherein each said second soft symbol value corresponds to a symbol closest in Euclidean distance to said most likely symbol whose bit in the position of interest is opposite that of the analogous bit in said most likely symbol;
   computing a soft bit value for each bit of interest as a function of said first soft symbol value and said m second soft symbol values; and
   wherein m and M are positive integers.

19. The method according to claim 18, wherein said M-ary symbols are transmitted in a global system for mobile communication (GSM) network.

20. The method according to claim 18, wherein said method of generating soft bit outputs is implemented in a GSM EDGE Radio Access Network (GERAN) system.

21. The method according to claim 18, further comprising the step of providing an outer decoder operative to generate receive binary data in accordance with said soft bit outputs.

22. The method according to claim 21, wherein said outer decoder comprises a convolutional decoder based on the Viterbi Algorithm (VA).

23. The method according to claim 18, wherein said M-ary symbol comprises an 8-PSK symbol.

24. The method according to claim 18, wherein said step of computing comprises generating said soft bit values represented as bit log likelihood ratios (LLRs).

25. The method according to claim 18, wherein said soft symbol values are generated by a maximum likelihood sequence estimation (MLSE) equalizer based on the Soft Output Viterbi Algorithm (SOVA).

26. The method according to claim 18, wherein said soft symbol values are generated by a maximum a posterior (MAP) algorithm based equalizer.

27. The method according to claim 18, wherein said soft bit values are generated from the m+1 soft symbol values whereby the most likely log likelihood value is compared with one other symbol log likelihood value corresponding to a bit value opposite to that of the bit of interest.

28. The method according to claim 27, further comprising the step of outputting said soft bit values to a soft decoder for decoding into binary data therefrom.

29. The method according to claim 18, further comprising the step of outputting said soft bit values to a de-interleaver whose output is subsequently input to a soft decoder for decoding into binary data therefrom.

30. The method according to claim 18, wherein said step of computing comprises computing a Max-Log approximation with a refinement.

31. A method of generating soft bit outputs from soft symbol decisions for an M-ary symbol, said method comprising the steps of:
   receiving M soft symbol decisions for each symbol, wherein each symbol is represented by m bits;
   partitioning said soft symbol decisions into m bit groups, each said bit group comprising a zero-bit portion and a one-bit portion;
   selecting, for each bit group of interest, a first maximum soft symbol value from among the soft symbol values in said zero-bit portion;
   selecting, for each bit group of interest, a second maximum soft symbol value from among the soft symbol values in said one-bit portion;
   computing a soft bit value for each bit of interest as a function of said first maximum soft symbol value and said second maximum soft symbol value; and
   wherein m and M are positive integers.

32. The method according to claim 31, wherein said M-ary symbols are transmitted in a global system for mobile communication (GSM) network.

33. The method according to claim 31, wherein said method of generating soft bit outputs is implemented in a GSM EDGE Radio Access Network (GERAN) system signal.

34. The method according to claim 31, further comprising the step of providing an outer decoder operative to generate receive binary data in accordance with said soft bit output values.

35. The method according to claim 34, wherein said outer decoder comprises a convolutional decoder based on the Viterbi Algorithm (VA).

36. The method according to claim 31, wherein said M-ary symbol comprises an 8-PSK symbol.

37. The method according to claim 31, wherein said step of computing comprises generating said soft bit values represented as bit log likelihood ratios (LLRs).

38. The method according to claim 31, wherein said soft symbol values are represented as symbol log likelihood ratios (LLRs).

39. The method according to claim 31, wherein said zero-bit portion comprises those soft symbol decisions that correspond to those symbols having a zero bit in the particular bit position of interest.

40. The method according to claim 31, wherein said one-bit portion comprises those soft symbol decisions that correspond to those symbols having a one bit in the particular bit position of interest.

41. The method according to claim 31, wherein said soft symbol decisions are generated by a maximum likelihood sequence estimation (MLSE) equalizer based on the Soft Output Viterbi Algorithm (SOVA).

42. The method according to claim 31, wherein said soft symbol decisions are generated by a maximum a posterior (MAP) algorithm based equalizer.

43. The method according to claim 31, wherein said soft bit values are generated from said soft symbol values whereby a most likely log likelihood value is compared with one other symbol log likelihood value corresponding to a bit value opposite to that of the bit of interest.

44. The method according to claim 43, further comprising the step of outputting said soft bit values to a soft decoder for decoding into binary data therefrom.

45. The method according to claim 31, wherein said step of computing comprises computing a Max-Log approximation with a refinement.

46. The method according to claim 31, further comprising the step of outputting said soft bit values to a de-interleaver whose output is subsequently input to a soft outer decoder for decoding into binary data therefrom.

47. The method according to claim 31, wherein said M soft symbol decisions for each symbol comprise M−1 soft symbol decisions and an implied reference symbol.

48. A method of generating soft bit information from soft symbol information, said method comprising the steps of:
   receiving a plurality of soft symbol values for each symbol;
   determining, for each bit position of interest, a first soft symbol value corresponding to a maximum soft symbol value wherein the bit of interest is a zero and a second soft symbol value corresponding to a maximum soft symbol value wherein a bit of interest is a one;
   utilizing an overall maximum soft symbol value for either said zero bit or said one bit in accordance with the value of the bit in the bit position of interest of said overall maximum soft symbol;
   utilizing for the other bit, the value of a soft symbol closest in Euclidean distance to said overall maximum soft symbol whose bit in the position of interest is opposite that of the analogous bit in said overall maximum soft symbol; and
   approximating a log likelihood ratio for a particular bit of interest as the difference between said second soft symbol value and said first soft symbol value.

49. The method according to claim 48, wherein said soft symbol values are represented as log likelihood ratios.

50. The method according to claim 48, wherein said soft symbol information is provided for an 8-PSK symbol.

51. The method according to claim 48, wherein said soft symbol values are generated by a maximum a posteriori (MAP) algorithm based equalizer.

52. The method according to claim 48, further comprising the step of outputting said soft bit information to a soft decoder for decoding into binary data therefrom.

53. A communications receiver for receiving and decoding an M-ary transmitted signal, comprising:
   a radio frequency (RF) front end circuit for receiving and converting said M-ary transmitted signal to a baseband signal;
   a demodulator adapted to receive said baseband signal and to generate a received signal therefrom in accordance with the M-ary modulation scheme used to generate said transmitted signal;
   a first decoder operative to receive said received signal and to generate a sequence of soft symbol decisions therefrom;
   a soft symbol to soft bit output converter comprising processing means programmed to:
      receive a plurality of soft symbol values for each symbol;

determine, for each bit position of interest, a first symbol value corresponding to a maximum soft symbol value wherein the bit of interest is a zero and a second soft symbol value corresponding to a maximum soft symbol value wherein a bit of interest is a one;

utilize an overall maximum soft symbol value for either said zero bit or said one bit in accordance with the value of the bit in the bit position of interest of said overall maximum soft symbol;

utilize for the other bit, the value of a soft symbol closest in Euclidean distance to said overall maximum soft symbol whose bit in the position of interest is opposite that of the analogous bit in said overall maximum soft symbol;

approximate a log likelihood ratio for a particular bit of interest as the difference between said second soft symbol value and said first soft symbol value; and a second decoder adapted to receive soft bit values and to generate binary received data therefrom.

54. The receiver according to claim 53, further comprising a speech decoder operative to convert the output of said second decoder to an audible speech signal.

55. The receiver according to claim 53, further comprising circuit switch data means for converting the output of said second decoder to a data stream.

56. The receiver according to claim 53, further comprising packet switch data means for converting the output of said second decoder to a data stream.

57. The receiver according to claim 53, wherein said communications receiver is adapted to receive and decode a Global System for Mobile Communication (GSM) signal.

58. The receiver according to claim 53, wherein said communications receiver is adapted to receive and decode a GSM EDGE Radio Access Network (GERAN) system signal.

59. The receiver according to claim 53, wherein said second decoder comprises a convolutional decoder based on the Viterbi Algorithm (VA).

60. The receiver according to claim 53, wherein said M-ary signal comprises an 8-PSK signal.

61. The receiver according to claim 53, further comprising the step of generating said soft symbol values represented as log likelihood ratios (LLR).

62. The receiver according to claim 53, wherein said first decoder comprises a maximum likelihood sequence estimation (MLSE) equalizer based on the Soft Output Viterbi Algorithm (SOVA).

63. The receiver according to claim 53, wherein said first decoder comprises means for performing maximum a posterior (MAP) algorithm.

64. The receiver according to claim 53, wherein said soft bit values are computed from said soft symbol values whereby a most likely log likelihood value is compared with one other symbol log likelihood value corresponding to a bit value opposite to that of the bit of interest.

65. The receiver according to claim 53, wherein said step of approximating comprises computing a Max-Log approximation with a refinement.

66. The receiver according to claim 53, further comprising the step of outputting said soft bit values to a de-interleaver whose output is subsequently input to a soft second decoder for decoding into binary data therefrom.

67. The receiver according to claim 53, wherein said processing means comprises an electronic data storage media storing a computer program adapted to execute on said processing means for implementing said soft symbol to soft bit converter.

68. A computer readable storage medium having a computer program embodied thereon for causing a suitably programmed system to generate soft output values by performing the following steps when such program is executed on said system:

receiving a plurality of soft symbol values for each symbol;

determining, for each bit position of interest, a first soft symbol value corresponding to a maximum soft symbol value wherein the bit of interest is a zero and a second soft symbol value corresponding to a maximum soft symbol value wherein a bit of interest is a one;

utilizing an overall maximum soft symbol value for either said zero bit or said one bit in accordance with the value of the bit in the bit position of interest of said overall maximum soft symbol;

utilizing for the other bit, the value of a soft symbol closest in Euclidean distance to said overall maximum soft symbol whose bit in the position of interest is opposite that of the analogous bit in said overall maximum soft symbol; and approximating a log likelihood ratio for a particular bit of interest as the difference between said second soft symbol value and said first soft symbol value.

69. The computer readable storage medium according to claim 68, wherein said computer program is suitably programmed to represent soft symbol values as log likelihood ratios.

70. The computer readable storage medium according to claim 68, wherein said computer program is suitably programmed to provide soft symbol information for an 8-PSK symbol.

71. The computer readable storage medium according to claim 68, wherein said computer program is suitably programmed to generate soft symbol values by a maximum a posteriori (MAP) algorithm based equalizer.

72. The computer readable medium to claim 68, wherein said computer program is suitably programmed to output soft bit information to a soft decoder for decoding into binary data therefrom.

73. The computer readable storage medium according to claim 68, wherein said step of approximating comprises computing a Max-Log approximation with a refinement.

* * * * *